(No Model.) 2 Sheets—Sheet 1.
L. J. LARZELERE.
VALVE FOR STEAM ENGINES.
No. 574,808. Patented Jan. 5, 1897.
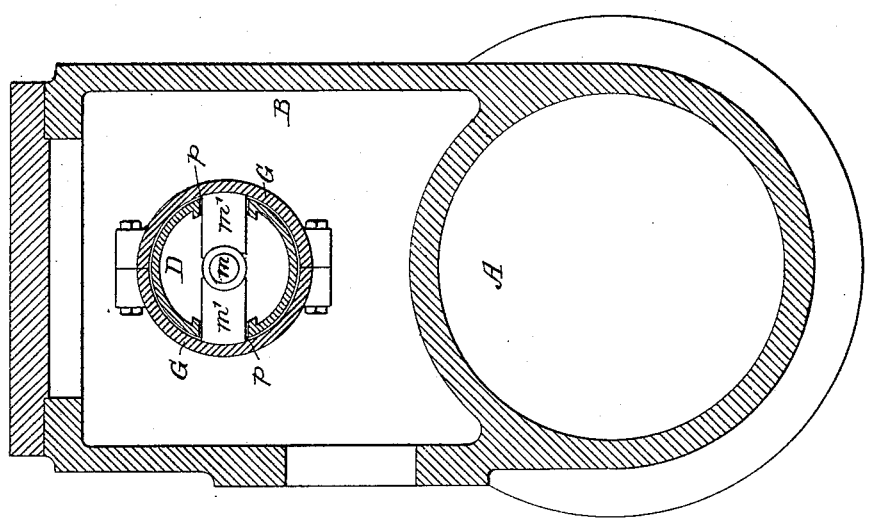
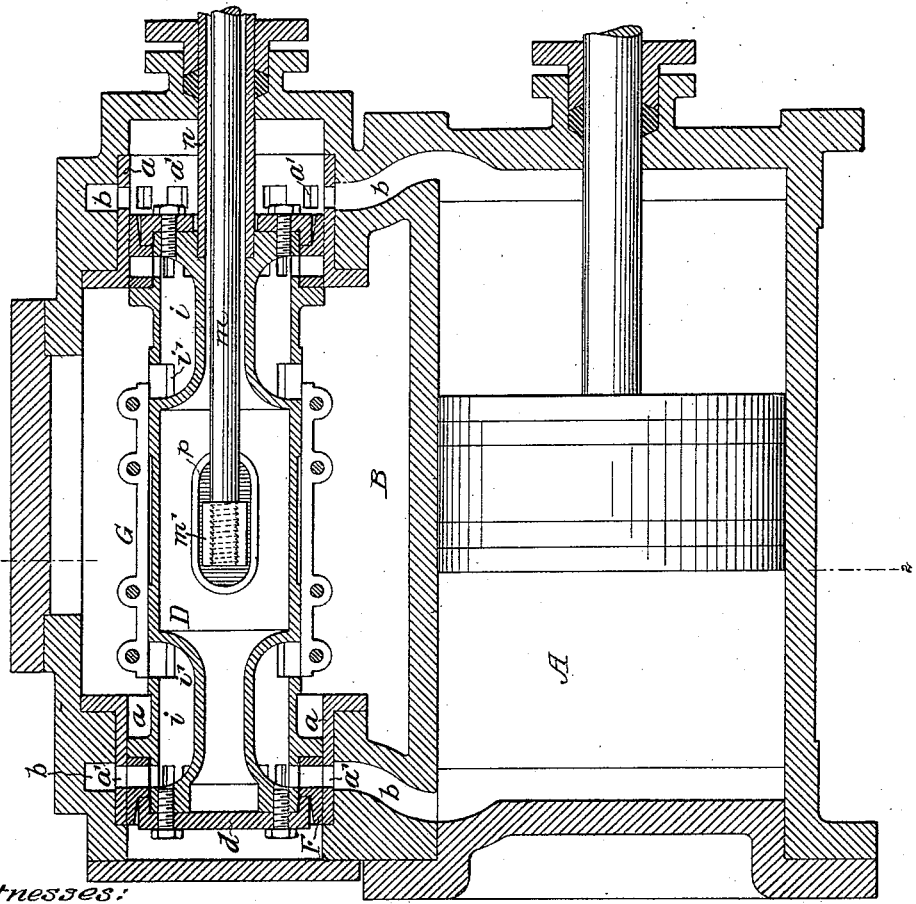
Witnesses:
R. Schleicher
Chas. De Bow.
Inventor: Linford J. Larzelere
by his Attorneys
Howson & Howson (No Model.) 2 Sheets—Sheet 2.

L. J. LARZELERE.
VALVE FOR STEAM ENGINES.

No. 574,808. Patented Jan. 5, 1897.

Witnesses:
R. Schleicher
Chas. De Cow

Inventor:
Linford J. Larzelere
by his Attorneys
Howson & Howson

UNITED STATES PATENT OFFICE.

LINFORD J. LARZELERE, OF WILLIAMSPORT, PENNSYLVANIA.

VALVE FOR STEAM-ENGINES.

SPECIFICATION forming part of Letters Patent No. 574,808, dated January 5, 1897.

Application filed November 21, 1895. Serial No. 569,699. (No model.)

*To all whom it may concern:*

Be it known that I, LINFORD J. LARZELERE, a citizen of the United States, and a resident of Williamsport, Pennsylvania, have invented certain Improvements in Valves for Steam-Engines, of which the following is a specification.

One object of my invention is to so construct a valve for steam-engines as to provide for keeping the same always tight by automatic means, that is to say, by means dependent upon the pressure of steam in the valve-chest, a further object being to provide a simple form of cut-off valve which can also be readily kept tight and can be operated without any unequal thrust or without any increase in the size of the main-valve chest. These objects I attain in the manner hereinafter set forth, reference being had to the accompanying drawings, in which—

Figure 3:
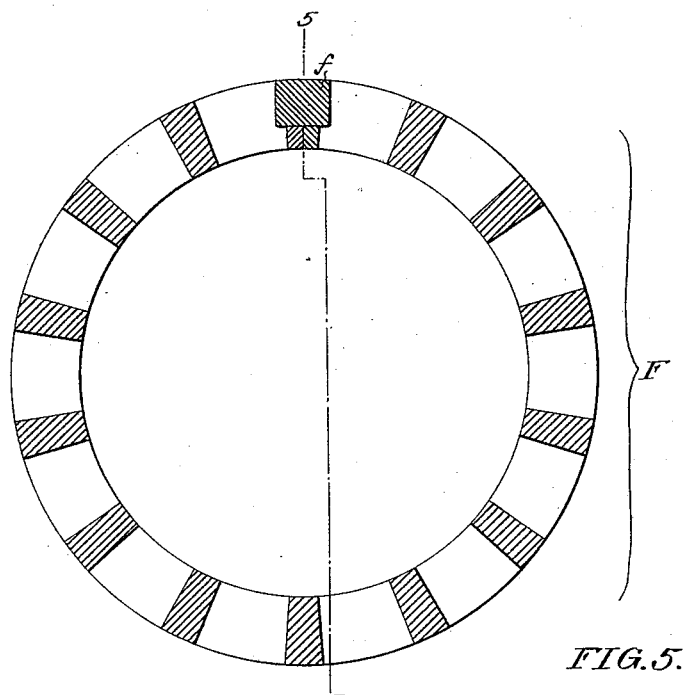
Figure 4:
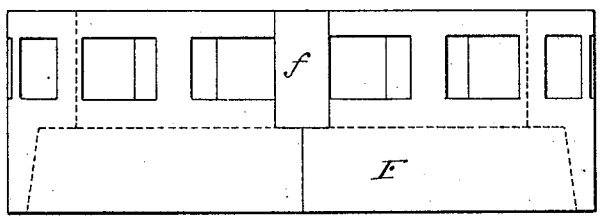
Figure 5:
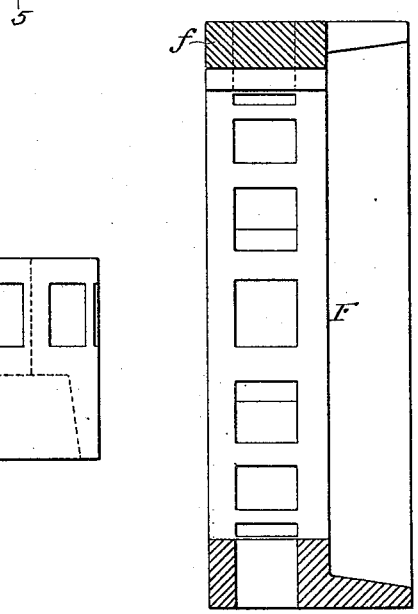

Figure 1 is a longitudinal section of the cylinder and steam-chest of a steam-engine constructed in accordance with my invention. Fig. 2 is a transverse section of the same on the line 2 2, Fig. 1. Fig. 3 is a transverse section, on an enlarged scale, of one of the packing-rings of the valve. Fig. 4 is a plan or top view of the same, and Fig. 5 is a section on the line 5 5, Fig. 3.

A represents the cylinder, which has cast or otherwise formed upon one side of the same the valve-chest B, the latter having at each end a bushing $a$ with ports $a'$, communicating with the ports $b$, leading to the corresponding end of the cylinder.

The main valve D is cylindrical and has at each end a ported packing-ring F, these rings operating, in conjunction with the ported bushings $a$ at each end of the valve-chest, so as to direct steam first to one end of the cylinder and then to the other end of the same, the exhaust from each end of the cylinder being directed into the valve-chest beyond the ends of the valve, from which points it is conducted to the main exhaust-pipe in any suitable manner.

Each of the valve-rings consists of a ported body portion and a projecting internally-tapered flange, and each ring is held to its seat on the end of the valve by means of a follower-plate $d$, which is securely bolted into place on the end of the valve, the faces of the expansion-ring being scraped to form a steam-tight joint between the flange on the main valve and the follower-plate, so as to prevent any escape of steam between the two.

Each packing-ring F is split at one point, so that it can be expanded by pressure of the steam against its inner face and thus caused to fit snugly at all times against the bushings $a$, thereby insuring tight joints and preventing the escape of steam from the central live-steam chamber of the chest to the exhaust-chambers at the ends of the same, and in order to prevent any leakage of the steam through the split portions of the packing-rings each ring is recessed at the split so as to form a pocket for receiving a block $f$, which extends throughout the width of the ported portion of the ring and bears against the follower $d$, so that it has the effect of closing the split in the packing-ring so far as any escape of steam therethrough is concerned.

By constructing the packing-rings F with flanges, as described, each ring has a broad bearing against the valve-chest bushing, while the area of the body portion of the ring which is subjected to the expanding pressure of the steam is much less than that of the flange. Hence the pressure of the flange against the bushing, while heavy enough to prevent leakage, is at the same time so light as to avoid unnecessary friction.

The steam is conveyed to the ported packing-rings from the steam-space of the valve-chest through U-shaped passages $i$, formed in the body of the valve and terminating in ports $i'$. At their inner ends and mounted exteriorly upon the central portion of the valve-body is a cut-off valve G, composed of two semicylindrical halves provided at top and bottom with lugs, whereby they may be bolted together so as to form a steam-tight fit with the body of the valve. The cut-off-valve rod $m$ passes through the hollow main-valve rod $n$ and has at its inner end a cross-head $m'$, one end of which is secured to one half of the cut-off valve and the other end to the opposite half of the same, these ends of the cross-head passing through longitudinal slots $p$, formed in the sides of the central portion of the main body of the valve. By this means power is applied to the cut-off valve from an axial point. Hence the valve is moved without any excessive strain upon one side or the other, the location of the cut-off rod within the hollow main-valve rod insuring compactness and rendering unnecessary any extension of the valve-chest for the formation of a special stuffing-box to receive an independently-located cut-off-valve rod. This arrangement also provides a ready means for determining whether there is any leakage between the cut-off valve and the main valve, as such leakage must find its way through the slots $p$ into the interior of the main valve and thence around the cut-off-valve rod to the stuffing-box for the latter. Hence by removing the follower and packing from said stuffing-box the fact of leakage between the main and cut-off valve can be at once determined. In case of wear of the cut-off valve such wear can be readily compensated for by facing off the inner edges of the two halves of the valve and their lugs until the desired amount of wear has been taken up and then bolting the two halves of the valve together again.

When the expansion-rings are employed in connection with a valve having a cut-off valve, as described, the wear of the rings is materially reduced as compared with a valve having expansion-rings which are always subjected to the full pressure of the live steam. For instance, if the cut-off valve is cutting off steam at one-quarter stroke of engine full boiler-pressure is only exerted on the packing-rings during the time that this quarter-stroke is being made, the pressure being then gradually reduced, owing to the expansion of steam in the cylinder, until the main valve cuts off by closing the ports $b$. At this final cut off the rings are subjected to the pressure existing in the cylinder and main-valve ports at that time, while further expansion is taking place in the cylinder until the end of the stroke. Hence there can be no outside pressure on the packing-rings, by compression or otherwise, greater than the internal pressure exerted thereon, and the packing-rings are always maintained in the expanded condition with sufficient force to prevent leakage of steam around the same.

The steam under pressure in the main-valve ports is not lost, but is used again on the next admittance of steam to that end of the cylinder.

As the packing-rings are exposed to the steam in the conveyer-passages of the valve, that is to say, the passages between the cut-off valve and the ports of the valve-chest, it follows that they are only subjected to the average pressure of steam during each stroke instead of being subjected to the full live-steam pressure at all times, as in other valves with which I am familiar.

Having thus described my invention, I claim and desire to secure by Letters Patent—

1. The combination of the ported valve-chest, with the cylindrical valve having at each end a split packing-ring, consisting of a body portion with lateral outer flange, follower-plates for holding the body portion of said packing-rings in place longitudinally on the valve-body, and means for conveying steam on its way to the cylinder to the inner sides of the contracted body portion of said packing-rings for expanding the same, substantially as specified.

2. The combination of the ported valve-chest, with the cylindrical valve having at each end a packing-ring provided with ports adapted to coact with those of the chest to direct steam first to one end of the cylinder and then to the other end of the same, and follower-plates for holding said packing-rings longitudinally in place on the valve, substantially as specified.

3. The combination of the ported valve-chest, the cylindrical valve having passages for conveying steam from the live-steam chamber of the valve-chest, a cut-off valve acting in conjunction with the receiving ends of said passages, and packing-rings at the ends of the valve, said rings being subjected to the pressure of steam in the conveying-passages of the valve, substantially as specified.

4. The combination of the ported valve-chest, the cylindrical valve having ported packing-rings at each end, passages in the valve leading from said ported packing-rings to the central steam-chamber of the chest, and a cut-off valve acting in conjunction with the receiving ends of said passages, substantially as specified.

5. The combination of the cylindrical main valve having slotted sides, a tubular main-valve rod, a cylindrical cut-off valve surrounding the main valve, a cut-off-valve rod passing through the tubular main-valve rod, and a cross-head passing through the slots in the sides of the main valve and serving to connect the exterior cut-off valve to the inner end of the cut-off-valve rod, substantially as specified.

6. The combination of the cylindrical main valve having slotted sides, a tubular main-valve rod, a cylindrical cut-off valve surrounding the main valve, and composed of sections bolted together, a cut-off-valve rod passing through the tubular main-valve rod, and a cross-head passing through the slots in the sides of the main valve and serving to connect the exterior cut-off valve to the inner end of the cut-off-valve rod, substantially as specified.

In testimony whereof I have signed my name to this specification in the presence of two subscribing witnesses.

LINFORD J. LARZELERE.

Witnesses:
  JOHN SHOUP,
  LEVI ABBOTT.